(12) United States Patent
Phillips et al.

(10) Patent No.: US 11,120,448 B2
(45) Date of Patent: *Sep. 14, 2021

(54) CUSTOMER IDENTIFICATION VERIFICATION PROCESS

(71) Applicant: Capital One Services, LLC, McLean, VA (US)

(72) Inventors: Jeremy Phillips, Brooklyn, NY (US); Zhe Liu, McLean, VA (US); Catherine Bousquet, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/358,100

(22) Filed: Mar. 19, 2019

(65) Prior Publication Data

US 2019/0213594 A1  Jul. 11, 2019

Related U.S. Application Data

(63) Continuation of application No. 15/791,017, filed on Oct. 23, 2017, now Pat. No. 10,318,957.

(51) Int. Cl.
*G06Q 20/40* (2012.01)
*H04L 9/32* (2006.01)
(Continued)

(52) U.S. Cl.
CPC ......... *G06Q 20/4014* (2013.01); *G06F 21/33* (2013.01); *G06F 21/335* (2013.01);
(Continued)

(58) Field of Classification Search
None
See application file for complete search history.

(56) References Cited

U.S. PATENT DOCUMENTS

| 6,101,605 A * | 8/2000 | Buer ................ H04L 9/0894 713/189 |
| 6,385,341 B1 * | 5/2002 | Lisitsa ................ G06T 9/005 358/539 |

(Continued)

OTHER PUBLICATIONS

Avdyushkin et al (Secure Location Validation with Wi-Fi Geofencing and NFC) (Year: 2015).*

(Continued)

*Primary Examiner* — Mamon Obeid
(74) *Attorney, Agent, or Firm* — Harrity & Harrity, LLP

(57) ABSTRACT

An example device may include one or more processors to receive a request for a service from a requestor user device; provide transaction information associated with the service to a provider user device, where the transaction information may include location information corresponding to a location at which the service may be provided; obtain verification information from the requestor user device based on an interaction associated with the requestor user device or the provider user device at the location, where the verification information may include one or more characteristics of the requestor user device; generate a verification token based on the one or more characteristics of the requestor user device; provide the verification token to the requestor user device; and provide the verification information to the provider user device to permit the provider user device to verify the requestor user device, in connection with performance of the service, based on receiving the verification information and obtaining the verification token from the requestor user device.

20 Claims, 11 Drawing Sheets

(51) Int. Cl.

| | | |
|---|---|---|
| *G06K 19/06* | (2006.01) | |
| *G06Q 20/26* | (2012.01) | |
| *G06Q 20/24* | (2012.01) | |
| *G06Q 20/32* | (2012.01) | |
| *G06Q 20/38* | (2012.01) | |
| *G06F 21/34* | (2013.01) | |
| *G06Q 20/02* | (2012.01) | |
| *G06F 21/33* | (2013.01) | |
| *G06F 21/35* | (2013.01) | |
| *G06F 21/62* | (2013.01) | |

(52) U.S. Cl.
CPC .............. *G06F 21/34* (2013.01); *G06F 21/35* (2013.01); *G06F 21/6218* (2013.01); *G06K 19/06037* (2013.01); *G06Q 20/02* (2013.01); *G06Q 20/24* (2013.01); *G06Q 20/26* (2013.01); *G06Q 20/3223* (2013.01); *G06Q 20/3224* (2013.01); *G06Q 20/3274* (2013.01); *G06Q 20/385* (2013.01); *G06Q 20/38215* (2013.01); *G06Q 20/401* (2013.01); *H04L 9/3226* (2013.01); *G06F 2221/2111* (2013.01); *G06Q 2220/00* (2013.01); *H04L 2209/56* (2013.01); *H04L 2209/80* (2013.01)

(56) References Cited

U.S. PATENT DOCUMENTS

| | | | | |
|---|---|---|---|---|
| 6,411,725 B1 | * | 6/2002 | Rhoads | G10L 19/018 382/100 |
| 7,024,552 B1 | * | 4/2006 | Caswell | G06Q 20/367 713/155 |
| 7,111,323 B1 | * | 9/2006 | Bhatia | H04L 63/0815 707/999.009 |
| 7,143,289 B2 | * | 11/2006 | Denning | G06F 21/10 713/168 |
| 7,278,585 B2 | * | 10/2007 | Boitsov | G06K 19/06037 235/456 |
| 7,480,935 B2 | * | 1/2009 | Bazot | G06F 21/31 713/185 |
| 7,925,667 B2 | * | 4/2011 | Hessling | G01C 21/26 707/790 |
| D651,237 S | | 12/2011 | Mullen et al. | |
| D651,238 S | | 12/2011 | Mullen et al. | |
| D651,644 S | | 1/2012 | Mullen et al. | |
| D652,075 S | | 1/2012 | Mullen et al. | |
| D652,076 S | | 1/2012 | Mullen et al. | |
| D652,448 S | | 1/2012 | Mullen et al. | |
| D652,449 S | | 1/2012 | Mullen et al. | |
| D652,450 S | | 1/2012 | Mullen et al. | |
| D652,867 S | | 1/2012 | Mullen et al. | |
| D653,288 S | | 1/2012 | Mullen et al. | |
| D665,022 S | | 8/2012 | Mullen et al. | |
| D665,447 S | | 8/2012 | Mullen et al. | |
| D666,241 S | | 8/2012 | Mullen et al. | |
| D670,329 S | | 11/2012 | Mullen et al. | |
| D670,330 S | | 11/2012 | Mullen et al. | |
| D670,331 S | | 11/2012 | Mullen et al. | |
| D670,332 S | | 11/2012 | Mullen et al. | |
| D670,759 S | | 11/2012 | Mullen et al. | |
| D672,389 S | | 12/2012 | Mullen et al. | |
| D673,606 S | | 1/2013 | Mullen et al. | |
| D674,013 S | | 1/2013 | Mullen et al. | |
| D675,256 S | | 1/2013 | Mullen et al. | |
| D676,487 S | | 2/2013 | Mullen et al. | |
| D676,904 S | | 2/2013 | Mullen et al. | |
| D687,094 S | * | 7/2013 | Mullen | D19/9 |
| D687,095 S | * | 7/2013 | Mullen | D19/10 |
| D687,487 S | * | 8/2013 | Mullen | D19/10 |
| D687,488 S | * | 8/2013 | Mullen | D19/10 |
| D687,489 S | * | 8/2013 | Mullen | D19/10 |
| D687,490 S | * | 8/2013 | Mullen | D19/10 |
| D687,887 S | * | 8/2013 | Mullen | D19/10 |
| D688,744 S | * | 8/2013 | Mullen | D19/10 |
| D692,053 S | * | 10/2013 | Mullen | D19/10 |
| 8,694,438 B1 | * | 4/2014 | Jernigan | G06Q 20/3274 705/67 |
| 8,744,753 B2 | * | 6/2014 | Coch | G09B 29/10 701/409 |
| 8,874,477 B2 | * | 10/2014 | Hoffberg | G06Q 10/103 705/37 |
| 9,032,498 B1 | * | 5/2015 | Ben Ayed | G06F 21/35 726/9 |
| 9,191,386 B1 | * | 11/2015 | Yaron | H04L 63/0846 |
| 9,262,781 B2 | * | 2/2016 | MacKinnon Keith | G06Q 20/3276 |
| D786,878 S | * | 5/2017 | Markson | D14/437 |
| 9,660,985 B2 | * | 5/2017 | Cao | H04L 63/0853 |
| 9,699,606 B1 | * | 7/2017 | Bhatia | G06Q 10/0833 |
| 9,998,429 B2 | * | 6/2018 | Pieper | H04L 67/02 |
| 10,574,442 B2 | * | 2/2020 | Amiri | H04L 63/0428 |
| 2001/0054155 A1 | * | 12/2001 | Hagan | H04L 69/329 713/193 |
| 2003/0037070 A1 | * | 2/2003 | Marston | H04N 21/8586 |
| 2003/0229548 A1 | * | 12/2003 | Kakuta | G07F 7/1008 705/26.1 |
| 2004/0002843 A1 | * | 1/2004 | Robarts | A63F 13/12 703/13 |
| 2004/0215708 A1 | * | 10/2004 | Higashi | G06Q 30/02 709/201 |
| 2004/0260778 A1 | * | 12/2004 | Banister | H04L 51/12 709/206 |
| 2005/0050330 A1 | * | 3/2005 | Agam | G07F 7/1025 713/172 |
| 2006/0206616 A1 | * | 9/2006 | Brown | H04L 67/104 709/229 |
| 2007/0162961 A1 | * | 7/2007 | Tarrance | H04L 63/0435 726/5 |
| 2007/0220253 A1 | * | 9/2007 | Law | G06F 21/445 713/168 |
| 2008/0114697 A1 | * | 5/2008 | Black | G06Q 20/4014 705/67 |
| 2008/0280626 A1 | * | 11/2008 | Choi | H04L 63/12 455/456.1 |
| 2009/0313477 A1 | * | 12/2009 | Park | G06F 21/33 713/182 |
| 2010/0011431 A1 | * | 1/2010 | Cynkin | H04L 63/0807 726/9 |
| 2010/0150352 A1 | * | 6/2010 | Mansour | H04L 9/088 380/281 |
| 2010/0174919 A1 | * | 7/2010 | Ito | G06F 21/554 713/192 |
| 2010/0266129 A1 | * | 10/2010 | Tsuchiya | H04L 63/0428 380/278 |
| 2010/0281535 A1 | * | 11/2010 | Perry, Jr. | H04L 51/12 726/22 |
| 2010/0287057 A1 | * | 11/2010 | Aihara | G06Q 30/00 705/16 |
| 2010/0322035 A1 | * | 12/2010 | Rhoads | G07F 7/086 367/118 |
| 2011/0126009 A1 | * | 5/2011 | Camp, Jr. | H04L 9/3228 713/168 |
| 2012/0036360 A1 | * | 2/2012 | Bassu | H04L 9/3234 713/168 |
| 2012/0045064 A1 | * | 2/2012 | Rembarz | H04L 67/06 380/281 |
| 2012/0311688 A1 | * | 12/2012 | Lemus | G06F 21/33 726/8 |
| 2013/0026241 A1 | * | 1/2013 | Sakahashi | G06K 19/06037 235/494 |
| 2014/0046906 A1 | * | 2/2014 | Patiejunas | G06F 16/113 707/661 |
| 2014/0101453 A1 | * | 4/2014 | Senthurpandi | G06F 21/32 713/172 |
| 2014/0105395 A1 | * | 4/2014 | Hart | H04W 12/02 380/259 |
| 2014/0156528 A1 | * | 6/2014 | Frechette | G06Q 20/3278 705/44 |

(56) References Cited

U.S. PATENT DOCUMENTS

| | | | | |
|---|---|---|---|---|
| 2014/0298029 | A1* | 10/2014 | Lu | H04L 9/0891 713/172 |
| 2014/0371096 | A1* | 12/2014 | Umbricht | C12Q 1/686 506/9 |
| 2015/0142640 | A1* | 5/2015 | Kneen | G06Q 20/12 705/39 |
| 2015/0235215 | A1* | 8/2015 | Kumar | G06Q 20/322 705/44 |
| 2015/0254655 | A1* | 9/2015 | Bondesen | H04L 63/0892 705/72 |
| 2015/0269566 | A1* | 9/2015 | Gaddam | G06Q 20/385 705/67 |
| 2015/0286869 | A1* | 10/2015 | Ellenby | G06F 1/1686 382/103 |
| 2015/0332573 | A1* | 11/2015 | Selmanovic | H04W 4/02 455/457 |
| 2015/0348146 | A1* | 12/2015 | Shanmugam | G06Q 20/3224 705/71 |
| 2015/0356256 | A1* | 12/2015 | Cho | G16H 40/67 705/2 |
| 2016/0048796 | A1* | 2/2016 | Todasco | G06Q 10/083 705/330 |
| 2016/0170406 | A1* | 6/2016 | Al-Hajjaj | G06Q 50/04 700/96 |
| 2016/0224782 | A1* | 8/2016 | Miyakawa | H04L 63/0838 |
| 2016/0232588 | A1* | 8/2016 | Harmer | G06Q 10/02 |
| 2016/0335609 | A1* | 11/2016 | Jenkins | G06Q 20/1235 |
| 2016/0337346 | A1* | 11/2016 | Momchilov | H04L 63/0272 |
| 2017/0091699 | A1* | 3/2017 | Mueller | G06Q 20/3224 |
| 2017/0180346 | A1* | 6/2017 | Suarez | G06F 8/71 |
| 2017/0228690 | A1* | 8/2017 | Kohli | G06Q 10/0832 |
| 2017/0264438 | A1* | 9/2017 | Kirshenbaum | H04L 9/0872 |
| 2017/0366558 | A1* | 12/2017 | Liu | H04L 29/06 |
| 2018/0049043 | A1* | 2/2018 | Hoffberg | G06Q 20/40 |
| 2018/0124053 | A1* | 5/2018 | Mullender | H04L 9/12 |
| 2018/0191502 | A1* | 7/2018 | Karame | G06Q 20/02 |
| 2019/0318102 | A1* | 10/2019 | Araya | H04L 9/0822 |
| 2020/0342129 | A1* | 10/2020 | Chaiken | H04L 9/3247 |

OTHER PUBLICATIONS

Co-pending U.S. Appl. No. 15/791,017, filed Oct. 23, 2017.

Avdyushkin M., et al., "Secure Location Validation with Wi-Fi Geo-fencing and NFC," IEEE Trustcom/BigDataSE/ISPA, 2015, pp. 890-896.

Berbecaru D., "LRAP: A Location-Based Remote Client Authentication Protocol for Mobile Environments," 19th International Euromicro Conference on Parallel, Distributed and Network-Based Processing, 2011, pp. 141-145.

Dewi A.S., et al., "A User Authentication Scheme Using Real-Time Location, QR-Code, and One Time Password: A Preliminary Work," International Conference on Electrical Engineering and Informatics (ICELTICs), Sep. 2018, pp. 67-71.

Extended European Search Report for Application No. EP18201777. 2, dated Apr. 1, 2019, 8 pages.

Bakar K.A.A., et al., "Adaptive Authentication Based on Analysis of User Behavior," Science and Information Conference, Aug. 2014, pp. 601-606, XP032655092.

Boldyreva A., et al., "Identity-Based Encryption with Efficient Revocation," International Association for Cryptologic Research, Feb. 2012, vol. 20120206:155423, pp. 1-31, XP061005883.

* cited by examiner

CUSTOMER IDENTIFICATION VERIFICATION PROCESS

RELATED APPLICATION

This application is a continuation of U.S. patent application Ser. No. 15/791,017, filed Oct. 23, 2017, which is incorporated herein by reference.

BACKGROUND

People may often enter into transactions or request services from other people. In some instances, a transaction or service may involve a service requestor and a service provider meeting at a particular location and time to perform the transaction or service. Computing devices may be used by the service requestor and/or service provider to determine the meeting location and/or time.

SUMMARY

According to some implementations, a device may include one or more processors to receive a request for a service from a requestor user device; provide transaction information associated with the service to a provider user device, where the transaction information may include location information corresponding to a location at which the service may be provided; obtain verification information from the requestor user device based on an interaction associated with the requestor user device or the provider user device at the location, where the verification information may include one or more characteristics of the requestor user device; generate a verification token based on the one or more characteristics of the requestor user device; provide the verification token to the requestor user device; and/or provide the verification information to the provider user device to permit the provider user device to verify the requestor user device, in connection with performance of the service, based on receiving the verification information and obtaining the verification token from the requestor user device.

According to some implementations, a non-transitory computer-readable medium storing instructions that, when executed by one or more processors, cause the one or more processors to receive a request for a service from a requestor user device; provide transaction information associated with the service to a provider user device, where the transaction information may include location information corresponding to a location associated with the service; obtain verification information from the requestor user device based on an interaction between the requestor user device and the provider user device at the location, the verification information may include one or more characteristics of the requestor user device; encrypt a verification token based on the verification information; provide the verification token to the requestor user device; and/or provide the verification information to the provider user device to permit the provider user device to verify the requestor user device, in connection with performance of the service, based on receiving the verification information and obtaining the verification token from the requestor user device.

According to some implementations, a method may include receiving, by a server device, a request for a service from a requestor user device; providing, by the server device, transaction information associated with the service to a provider user device, where the transaction information may include location information corresponding to a location at which performance of the service is to occur; obtaining, by the server device, verification information from the requestor user device based on an interaction between the requestor user device and the provider user device at the location, where the verification information may include one or more characteristics of the requestor user device; providing, by the server device, the verification information to the provider user device to facilitate providing the service; generating, by the server device, a verification token based on the verification information; providing, by the server device, the verification token to the requestor user device; receiving, by the server device, a verification confirmation from the provider user device indicating that the provider user device verified the requestor user device based on the verification token and the verification information; and/or processing, by the server device, a transaction associated with the service based on receiving the verification information.

DETAILED DESCRIPTION

Figure 1A:
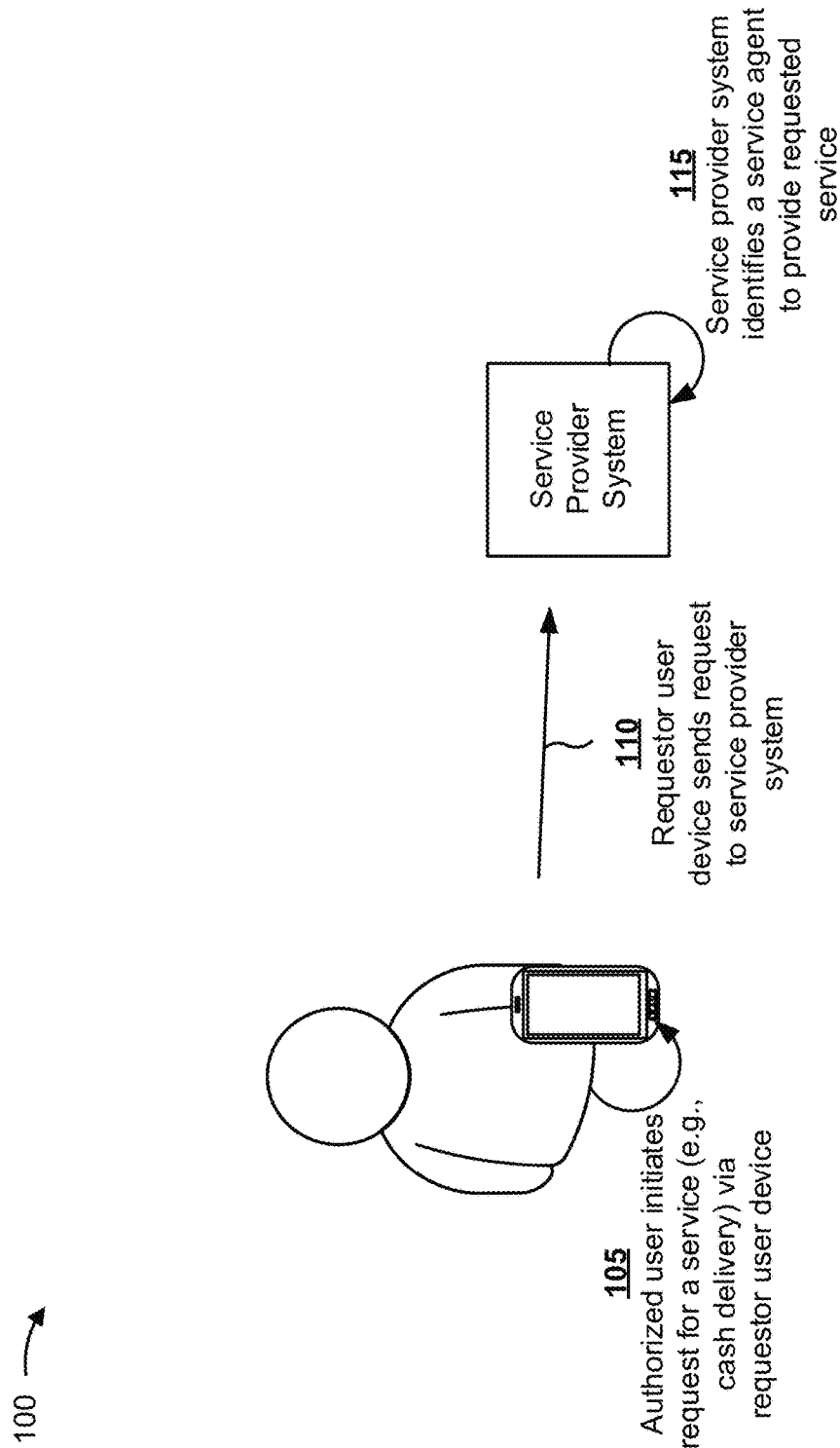
FIGS. 1A-1D are diagrams of an overview of an example implementation described herein.

The following detailed description of example implementations refers to the accompanying drawings. The same reference numbers in different drawings may identify the same or similar elements.

In location-based transactions, customers may frequently request a service and receive the service at a specified location at a later time than the request. For example, a customer may request a service via a user device and receive the service after a period of time passes while the customer and a service agent make arrangements to meet one another and/or travel to meet one another.

Accordingly, when providing the requested service of a location-based transaction, a service provider may need to verify an identity of the customer at the location of performance of the service to ensure that the customer is the individual that requested the service. In some instances, to receive the requested service from the service agent, the customer may present identification (e.g., a driver's license, a passport, a transaction card, and/or other forms of identification) and/or proof of purchase (e.g., a receipt, a digital confirmation of the request for service, and/or the like). However, these techniques may not prevent the service from being fraudulently received or stolen by an unauthorized individual. For example, the unauthorized individual may present a fake identification of the customer, may hack into the user device of the customer or a service provider system to access the proof of purchase, and/or the like. Examples herein may provide a customer verification process to verify a customer's identity and/or purchase, when a service agent is to provide a service to the customer.

According to some implementations described herein, a customer may use a requestor user device to request that a service (e.g., a currency delivery, cashier's check delivery, transaction card delivery, banking service, and/or the like) be provided by a service agent via a location-based transaction. The service agent may utilize a provider user device to verify the identity of the customer. In order for the service agent to verify a customer's identity during performance of the service using the requestor user device and the provider user device, a verification token may be generated based on characteristics of the requestor user device at or near a location and time that the service agent is to perform or provide the service to the customer. The verification token may be obtained from the requestor user device by the provider user device so that the service agent can verify that the customer requested the service via the requestor user device.

As an example of an implementation described herein, a verification token may include a customer's identification information (e.g., account number, name, date of birth, and/or the like). A requestor user device and/or service provider system may encrypt the identification information using one or more real-time characteristics of the requestor user device (e.g., time, location, and/or the like). Accordingly, the verification token may be decrypted, to determine the customer's identification information, using a current time and/or current location of a provider user device if the real-time characteristics of the provider user device match (within a threshold) the real-time characteristics of the requestor user device. If the customer's identification information matches the identification information of a request for service, the service may be provided and if not, the service may be denied. Or, if the real-time characteristics of the provider user device are outside of a threshold time period associated with the requestor user device or outside of a threshold distance of the location of the requestor user device, then the service may be denied.

Accordingly, because a verification token is generated, as described herein, based on characteristics of the requestor user device when the service is to be provided (e.g., real-time characteristics), the verification token is dynamically created and can be verified within a relatively short time period (e.g., within seconds or minutes) when compared to previous techniques. Therefore, the dynamically created verification token (which can be created based on a time and/or location of the requestor user device) leaves little to no opportunity for the verification token to be hacked, copied, stolen, and/or fraudulently used. As such, some implementations described herein may prevent fraudulent activity (e.g., fraudulently claiming to be an individual that requested a cash delivery in order to steal the cash) resulting in unnecessary use of computing resources (e.g., to correct or remedy the fraudulent activity), unnecessary costs (e.g., lost funds from the fraudulent activity), and/or the like.

FIGS. 1A-1D are diagrams of an overview of an example implementation 100 described herein. As shown in FIGS. 1A-1D, a service provider system facilitates customer identification verification based on a verification token generated using characteristics (e.g., real-time characteristics) of a requestor user device and/or provider user device during a time period that the customer meets with a service agent to receive a service.

As shown in FIG. 1A, and by reference 105, an authorized user (i.e., a customer) initiates a request for a service (e.g., a cash delivery in FIG. 1A) via a requestor user device. For example, the authorized user may log into an application (e.g., using a passcode) and/or utilize the application to initiate the request for the service. As shown by reference number 110, the requestor user device sends the request to a service provider system. The service provider system, as shown by reference number 115, identifies a service agent to provide the requested service. The service agent may be an individual, employed by (or not employed by but associated with, such as a customer of) an entity of the service provider system, that is available to meet (e.g., at a specified location in the request) with the authorized user to provide the requested service (e.g., to deliver cash).

Figure 1B:
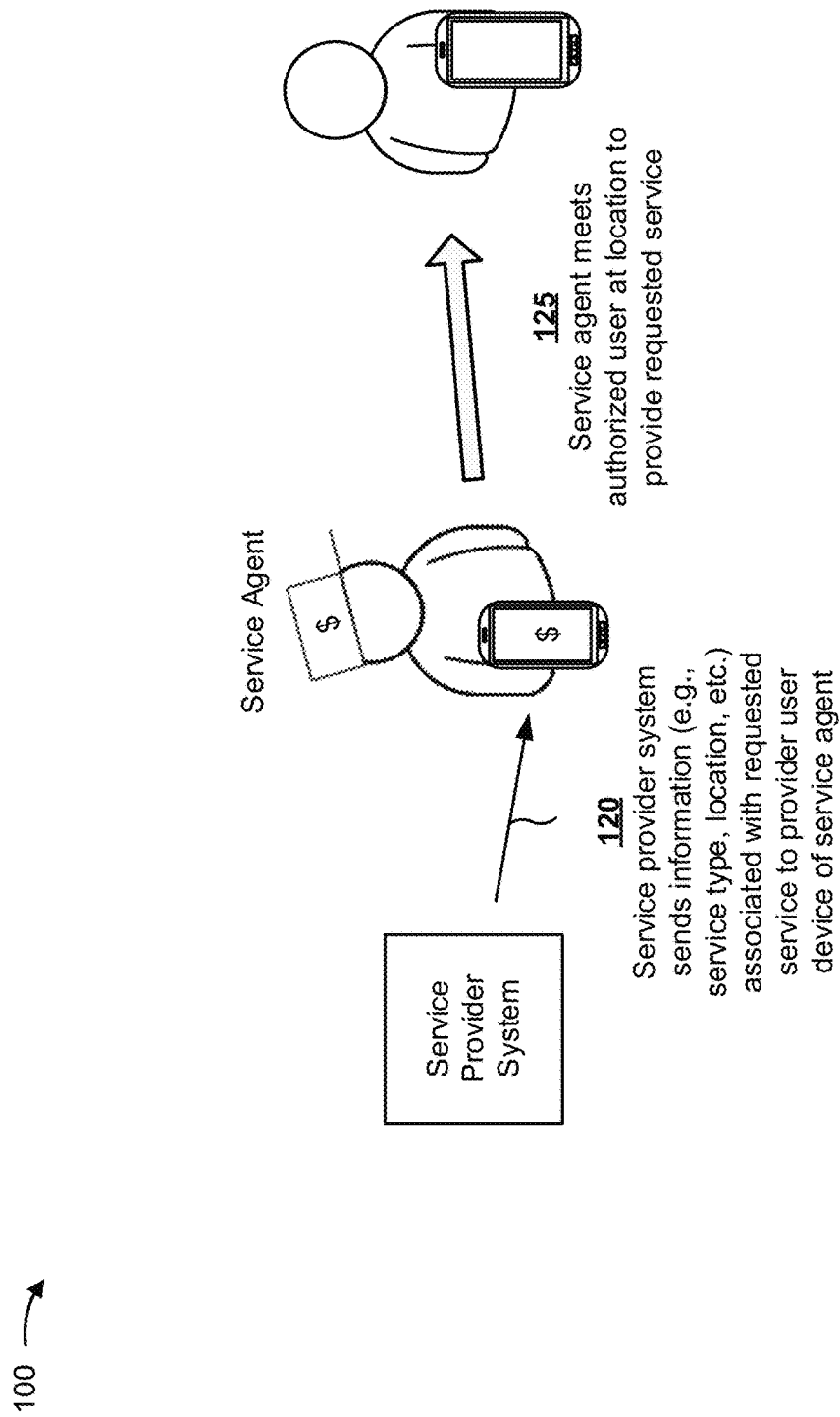

As shown by FIG. 1B, and by reference number 120, the service provider system sends information (e.g. a service type, a location, etc.) associated with the requested service to a provider user device of the service agent. As shown by reference number 125, the service agent meets with the authorized user at the location (e.g., the location specified in the request) to provide the requested service.

Figure 1C:
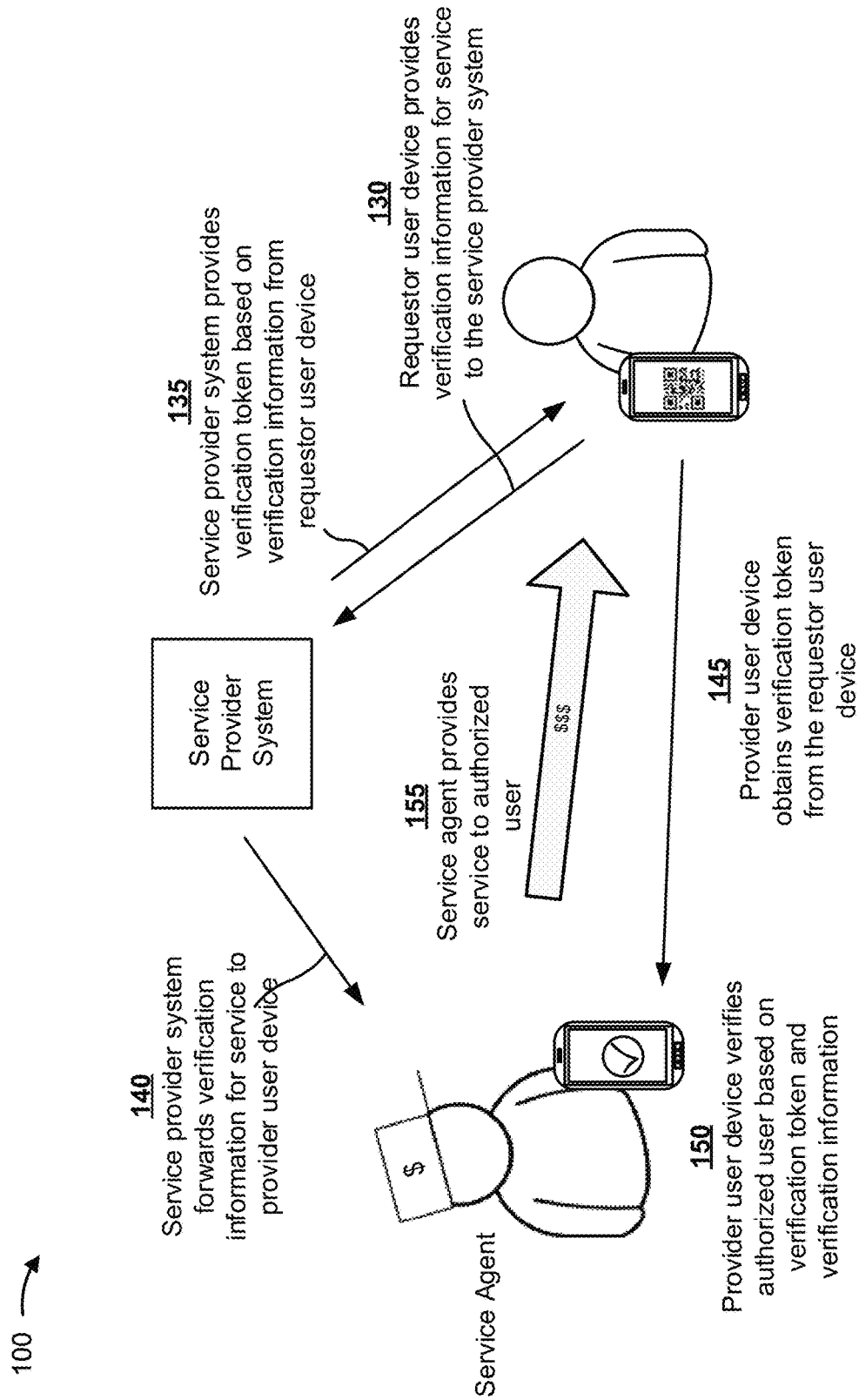

As shown in FIG. 1C, and by reference number 130, the requestor user device provides verification information for the service to the service provider system. The verification information may include characteristics of the requestor user device, such as a time of sending the verification information, a location of the requestor user device when sending the verification information, identification information of the requestor user device (e.g., identifier, make, model, serial number, and/or the like), identification information of the authorized user (e.g., name, date of birth, social security number, and/or the like), identification information of an account of the authorized user (e.g., account number, payment account information, routing number, etc.), and/or the like. In some implementations, the requestor user device provides the verification information based on an interaction with the provider user device, based on instructions from the authorized user (or service agent/provider user device), based on determining that the requestor user device (and/or the provider user device) is at the location of the request, and/or the like. As shown by reference number 135, the service provider system provides a verification token based on the verification information from the requestor user device. Furthermore, as shown by reference number 140, the service provider system forwards the verification information for the service to the provider user device.

As further shown in FIG. 1C, and by reference number 145, the provider user device obtains the verification token from the requestor user device. As shown by reference number 150, the provider user device verifies the authorized user based on the verification token and the verification information. For example, the provider user device may decrypt the verification token using an encryption key to determine that information in the verification token (e.g., information indicating characteristics of the requestor user device) matches the verification information. As shown by reference number 155, the service agent provides the service to the authorized user (e.g., delivers the cash to the authorized user).

Figure 1D:
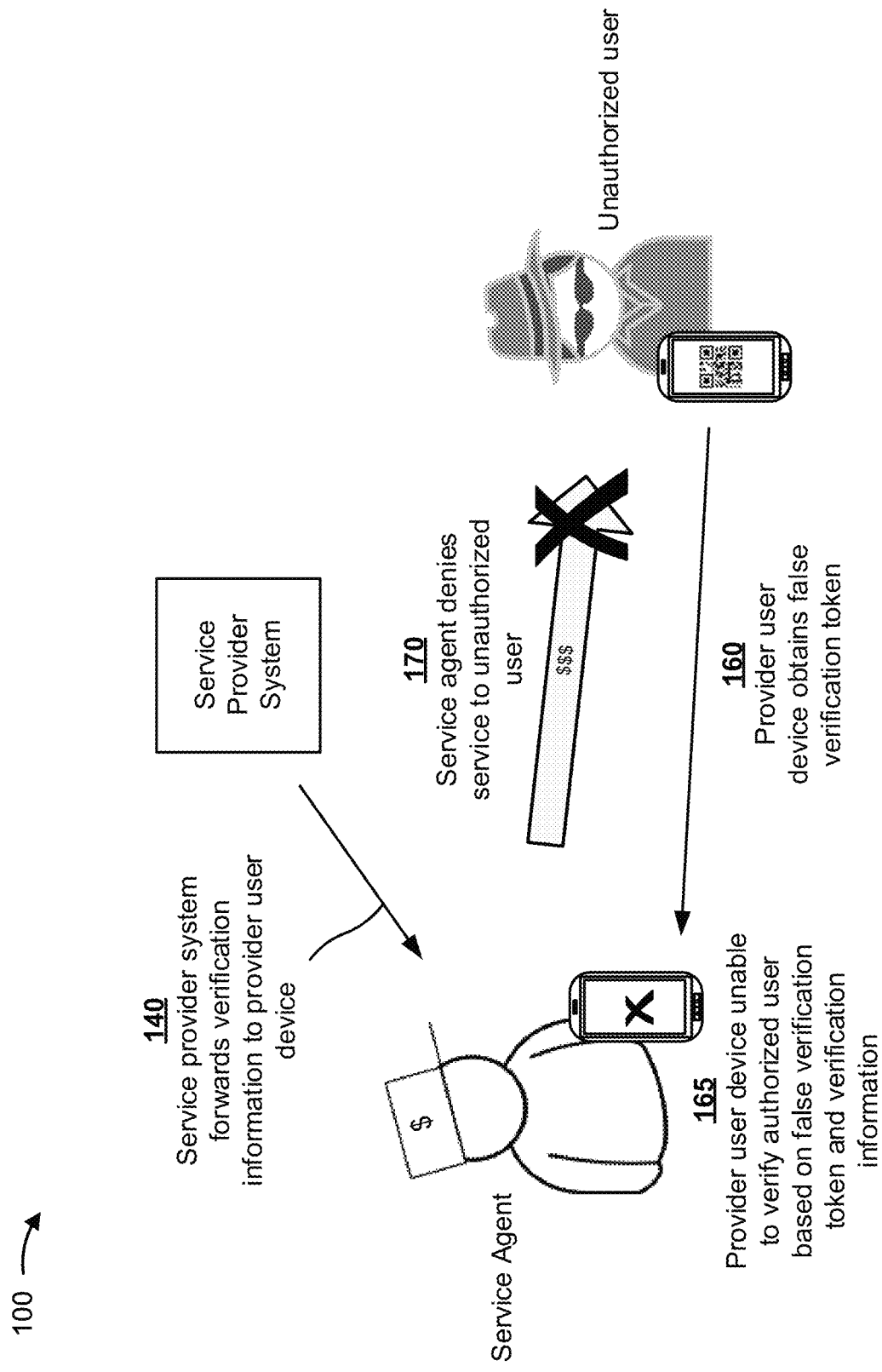

As shown in FIG. 1D, and by reference number 140 (similar to FIG. 1C), the service provider system forwards the verification information for the service to the provider user device. As shown by reference number 160, the provider user device obtains a false verification token from an unauthorized user. For example, the unauthorized user may be an individual fraudulently attempting to be the recipient of the requested service by presenting a false verification token (e.g., a verification token that was previously generated and/or stolen but never reimbursed for a service (e.g., was never redeemed for a cash transaction)), the unauthorized user may be an individual attempting to meet with another service agent to receive a service, the unauthorized user may be meeting with the service agent outside of a time window or location associated with performance of the service or a meeting between the authorized user and the service agent, and/or the like. Accordingly, as shown by reference number 165, the provider user device is unable to verify the unauthorized user based on the false verification token and the verification information. For example, the provider user device, when decrypting the false verification token, may determine that information from decrypting the false verification token does not match the verification information. More specifically, the decrypted information may not accurately indicate or include the characteristics of the authorized user's requestor user device that are indicated in the verification information. As such, as shown by reference number 170, the service agent may deny the service to the unauthorized user.

Accordingly, the example implementation 100 illustrates a customer (or authorized user) identification verification process that may accurately allow a service agent and/or provider user device to identify an authorized recipient of a requested service. As such, fraudulent activity or mistaken identity may be avoided in providing a location-based transaction (that may take place in extremely crowded spaces) to a customer, thus avoiding potential costs to remedy the fraudulent activity or mistaken identity and/or unnecessary use of computing resources associated with remedying the fraudulent activity or mistaken identity (e.g. closing or reopening accounts, adjusting transactions or balances of the accounts, and/or the like).

As indicated above, FIGS. 1A-1D are provided merely as an example. Other examples are possible and may differ from what was described with regard to FIGS. 1A-1D.

Figure 2:
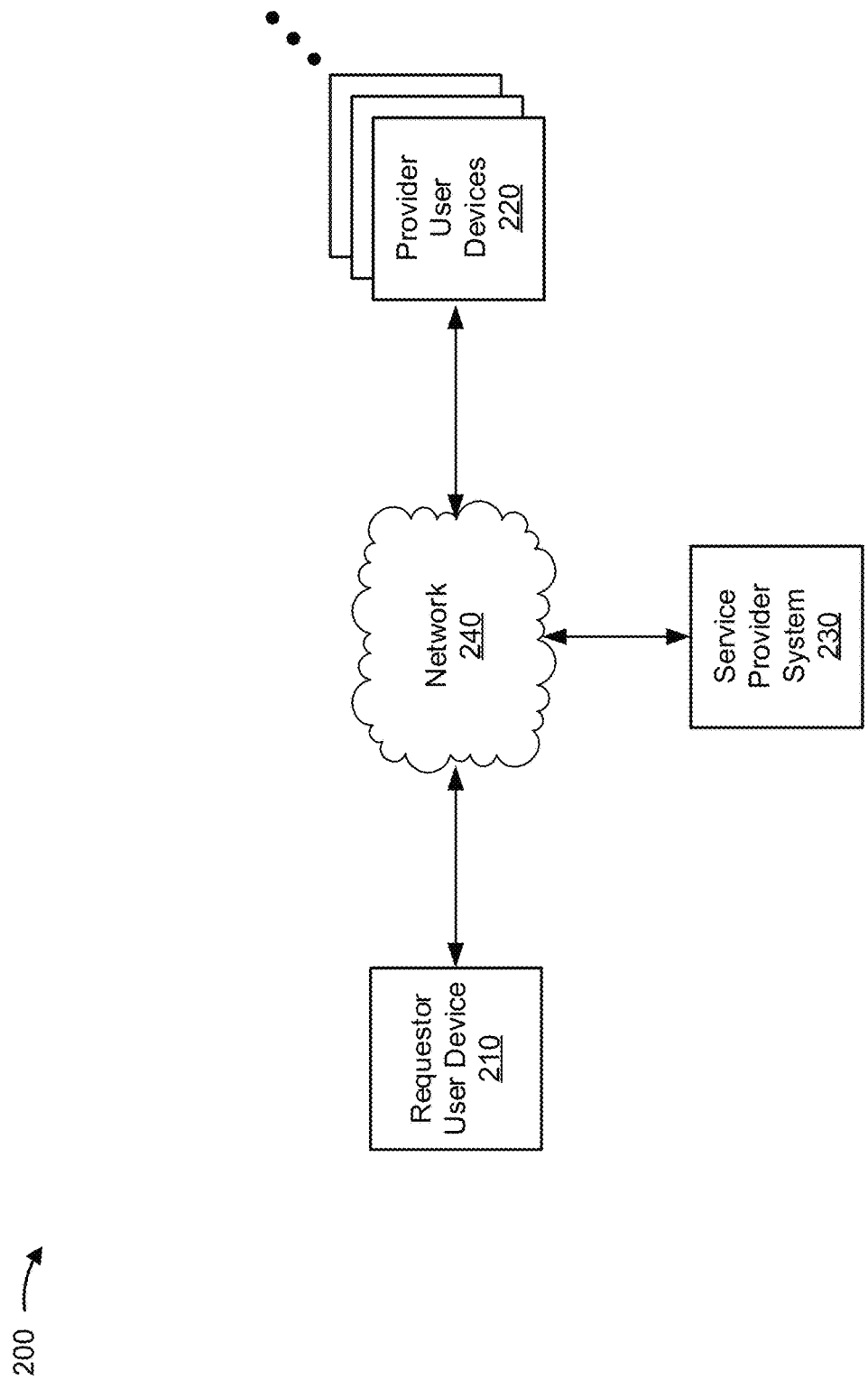
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a requestor user device 210, one or more provider user devices 220 (which may be referred to individually as provider user device 220), a service provider system 230, and a network 240. Devices of environment 200 may interconnect via wired connections, wireless connections, or a combination of wired and wireless connections.

Requestor user device 210 includes one or more devices capable of receiving, generating, storing, processing, and/or providing information associated with location-based transactions and/or customer identification verification. For example, requestor user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, requestor user device 210 may include hardware or a combination of hardware and software for determining a geographic location associated with requestor user device 210 (e.g., a global positioning system (GPS) sensor, Wi-Fi radio, Bluetooth radio, mapping application, or the like). In some implementations, requestor user device 210 may include one or more applications to facilitate location-based transactions, such as a peer-to-peer transaction application to facilitate transactions involving products and/or services that can be provided by nearby users, e.g., users of provider user devices 220.

Provider user device 220 includes one or more devices capable of receiving, generating, storing, processing, and/or providing information associated with location-based transactions and/or customer identification verification. In some implementations, provider user device 220 may include a device that is the same type as or a similar type to requestor user device 210. For example, provider user device 220 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, provider user device 220 may include hardware or a combination of hardware and software for determining a geographic location associated with provider user device 220 (e.g., GPS sensor, Wi-Fi radio, Bluetooth radio, mapping application, or the like). In some implementations, provider user device 220 may include one or more applications to facilitate location-based transactions, such as a peer-to-peer transaction application to facilitate transactions involving products and/or services that can be requested by nearby users, e.g., a user of requestor user device 210.

Service provider system 230 includes one or more devices capable of receiving, generating, storing, processing, and/or providing information associated with location-based transactions and/or customer identification verification. Service provider system 230 may include a computing device, such as a server computer, personal computer, mobile phone, laptop computer, tablet computer, or a similar type of device. In some implementations, service provider system 230 may be implemented by a group of server devices of a cloud computing environment or a data center. For example, some or all of the functions of service provider system 230 may be performed by one or more virtual machines implemented on one or more server devices in the cloud computing environment or the data center.

In some implementations, service provider system 230 includes hardware and/or a combination of hardware and software to enable communications with other devices, such as requestor user device 210 and provider user devices 220. In addition, service provider system 230 may be capable of generating a verification token, e.g., enabled by hardware and/or a combination of hardware and software, and/or enabled by communicating with a third party device capable of generating a verification token or verification information for the verification token. Service provider system 230 may, in some implementations, have access to local and/or remote storage of user data for users of requestor user device 210 and/or provider user devices 220. In this case, the user data may include authentication data, user preferences, and/or the like. In some implementations, service provider system 230 may be an application server, e.g., a server device associated with one or more applications that operates on requestor user device 210 and/or provider user devices 220 to facilitate peer-to-peer transactions between users (e.g., a customer and service agents) of requestor user device 210 and provider user devices 220.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
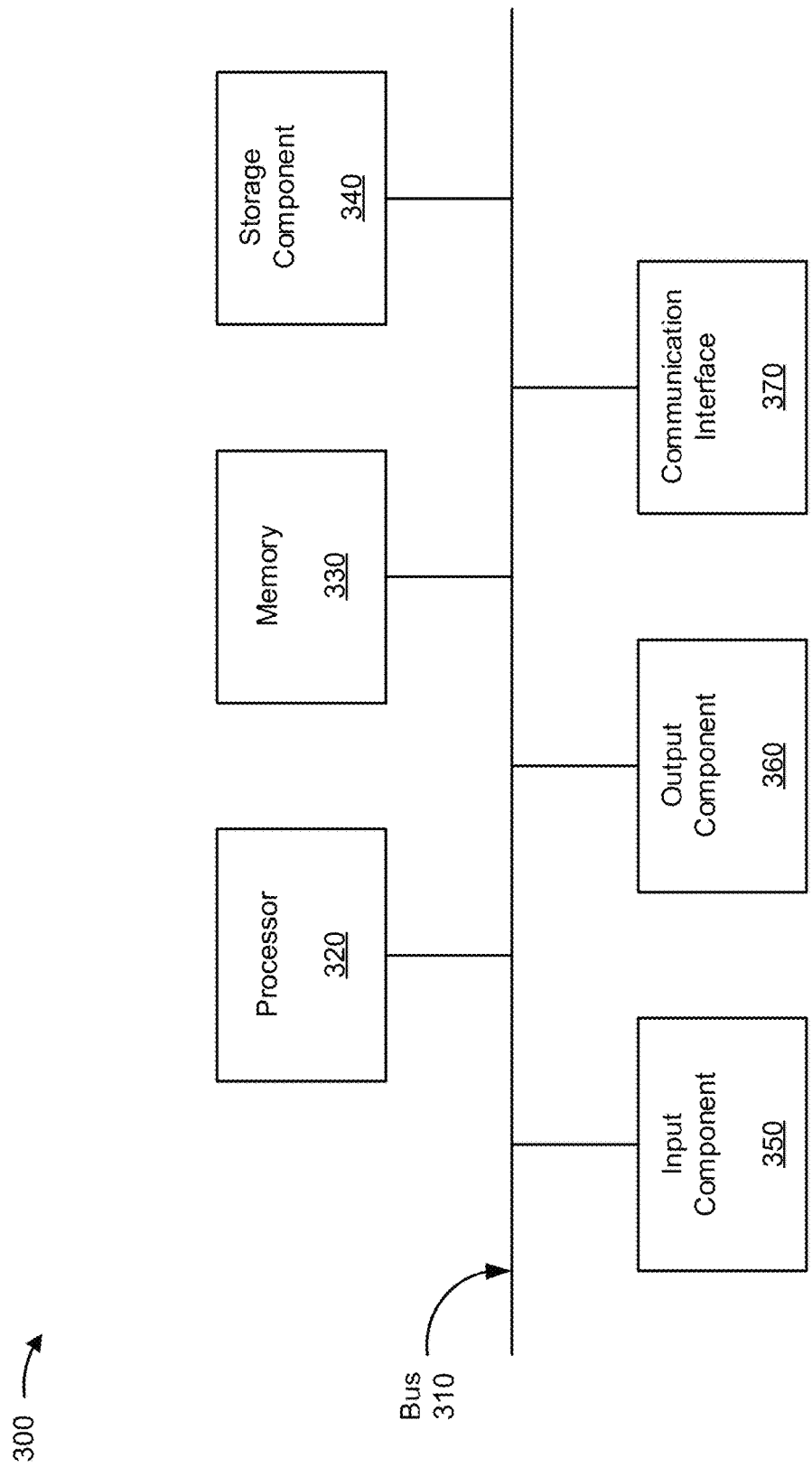
FIG. 3 is a diagram of example components of one or more devices of FIG. 2.

FIG. 3 is a diagram of example components of a device 300. Device 300 may correspond to requestor user device 210, provider user device 220, and/or service provider system 230. In some implementations, requestor user device 210, provider user device 220, and/or service provider system 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
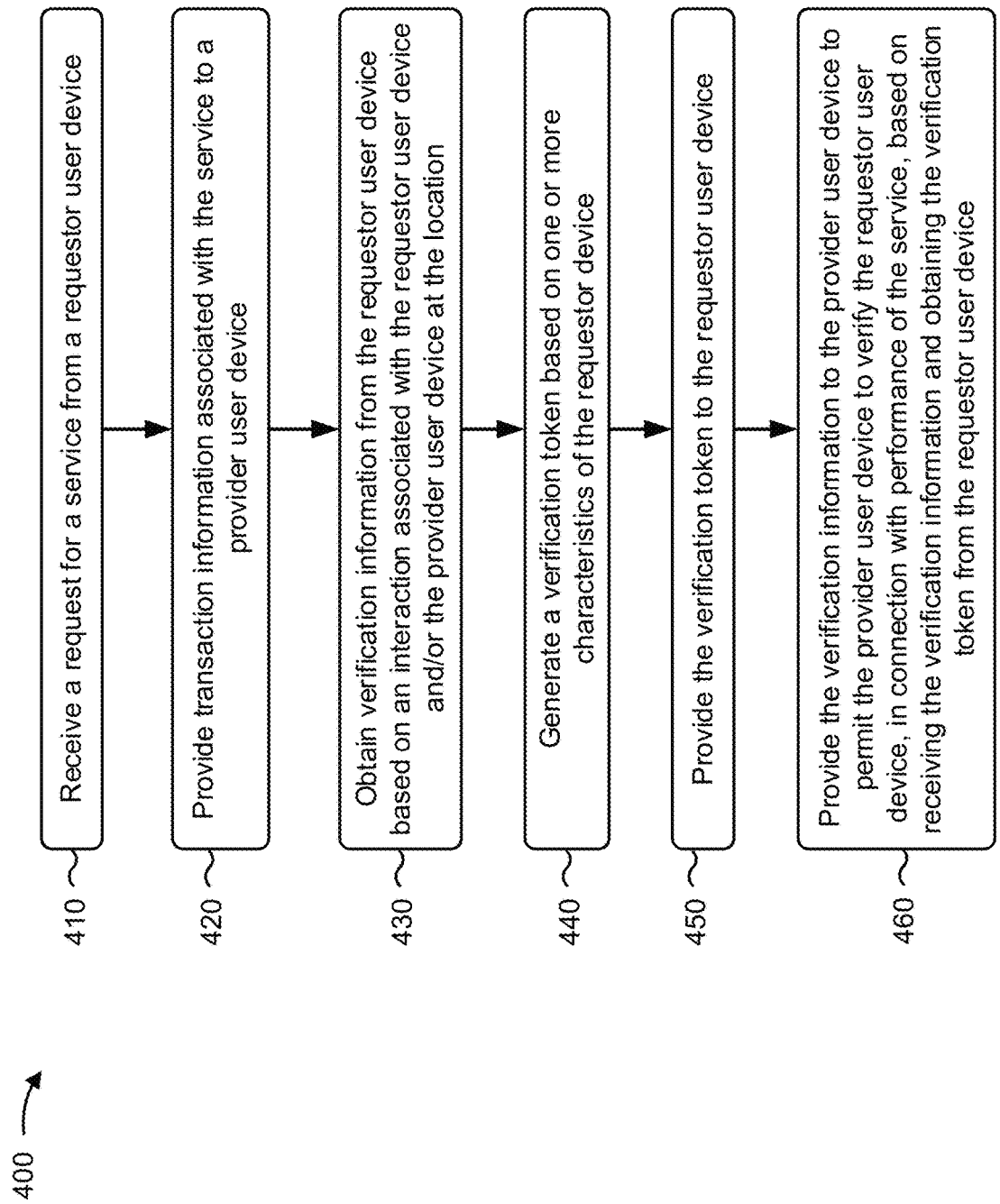
FIG. 4 is a flow chart of an example process for verifying customer identification for location-based transactions.

FIG. 4 is a flow chart of an example process 400 for verifying customer identification for location-based transactions. In some implementations, one or more process blocks of FIG. 4 may be performed by service provider system 230. In some implementations, one or more process blocks of FIG. 4 may be performed by another device or a group of devices separate from or including service provider system 230, such as requestor user device 210 or provider user device 220.

As shown in FIG. 4, process 400 may include receiving a request for a service from a requestor user device (block 410). For example, service provider system 230 may receive the request for a service associated with a location-based transaction using requestor user device 210. In some implementations, service provider system 230 may receive the request based on a user input received by requestor user device 210, based on an event causing requestor user device 210 to send the request for service, and/or based on requestor user device 210 receiving instructions, from another device, to request the service.

According to some implementations described herein, the service may be associated with a location-based transaction. As such, in some implementations, the service is to be received and/or provided at a particular location (e.g., a location indicated in the request). For example, a customer may wish for cash to be delivered to the customer. In such a case, the location may be either a current location of the customer, an expected future location of the customer, or a location associated with the customer (e.g., the customer's home, the customer's place of business, and/or the like). In some implementations, the service may involve delivering currency (cash), delivering a cashier's check, delivering a transaction card, providing a banking service (e.g., setting up a checking or savings account, issuing a loan, financial consulting, etc.), and/or the like.

In this way, service provider system 230 may receive a request for a service to permit service provider system 230 to provide transaction information associated with the service to a provider user device.

As further shown in FIG. 4, process 400 may include providing transaction information associated with the service to a provider user device (block 420). For example, service provider system 230 may provide the transaction information to provider user device 220. In some implementations, service provider system 230 may provide the transaction information to provider user device 220 based on receiving the request for the service.

In some implementations, the transaction information may include location information corresponding to a location at which the service is to be provided (e.g., by a service agent) and/or received (e.g., by a customer). For example, the location may be a location of a location-based transaction associated with the service. Additionally, or alternatively, the transaction information may identify a transaction identifier (e.g., a number or code assigned to the request or a transaction in connection with performance of the service), a time associated with providing the service, one or more instructions for providing the service (e.g., instructions for specific action for the service (e.g., how to deliver the service, how to notify customer of arrival, etc.), instructions for processing a transaction associated with the service, and/or the like), account information (e.g., user name, account identifier, account type, account status, and/or the like) associated with a user of the requestor user device, and/or the like.

In some implementations, service provider system 230 may identify and/or select provider user device 220 from a plurality of provider user devices 220 (e.g., associated with a plurality of available service agents to provide the service) to provide the service. In such cases, service provider system 230 may select provider user device 220 based on characteristics of provider user device 220 (which may be representative of characteristics of a service agent or individual (e.g., another customer of an entity of service provider system 230) associated with provider user device 220). For example, such characteristics of provider user device 220 may include a location of provider user device 220 (e.g., relative to a location where the service is to be provided), an ability to provide the service (e.g., whether the service agent associated with provider user device 220 is experienced, licensed, or registered to provide the service), a rating associated with provider user device 220 (e.g., indicating a service level associated with the service agent of provider user device 220), a schedule or availability associated with provider user device 220 to provide the service at a time indicated in the request, and/or the like. In some implementations, service provider system 230 may use machine learning techniques to determine which provider user device 220 should be selected. For example, service provider system 230 may train a machine learning model to produce a score associated with a user of provider user device 220 based on user device data provided by provider user devices 220, ratings for users of provider user devices, and user device data provided by requestor user devices 210. In this example, service provider system 230 may use the score provided as output from a machine learning model to select the particular provider user device 220 (e.g., the particular provider user device 220 for which service provider system 230 sends requestor user device 210 information, including location information).

In this way, service provider system 230 may provide transaction information associated with the service to provider user device 220 to permit provider user device 220 to provide a service after verifying identification of a customer associated with requestor user device 210.

As further shown in FIG. 4, process 400 may include obtaining verification information from the requestor user device based on an interaction associated with the requestor user device or the provider user device at the location (block 430). For example, service provider system 230 may obtain the verification information from requestor user device 210 based on the interaction at the location.

In some implementations the verification information may include one or more characteristics of requestor user device 210. The one or more characteristics may identify a location of requestor user device 210 when requestor user device 210 sends the verification information, a time at which requestor user device 210 sends the verification information, a device type of requestor user device 210, identification information of requestor user device 210 (e.g., an identifier, make, model, manufacturer, serial number (e.g., an international mobile equipment identity (IMEI)), or an application, on requestor user device 210, that is associated with the service (e.g., an application associated with an entity (e.g., a financial institution, courier service, and/or the like) that operates service provider system 230). Additionally, or alternatively, the verification information may include a transaction identifier to identify the request for service and/or a transaction associated with the request for service from requestor user device 210.

In some implementations, the verification information may be obtained from requestor user device 210 after a customer logs into an application associated with the service on requestor user device 210. Accordingly, a first stage of verification may be performed based on the customer logging into the application using a passcode, a username, a biometric token (e.g., a fingerprint scan, a facial recognition scan), and/or the like. In some implementations, a service agent may send, via provider user device 220, a notification to service provider system 230 indicating that the customer logged into the application in view of the service agent (e.g., indicating that the service agent s the customer log into the application). In such cases, service provider system 230 may verify the customer identity through a two stage process (e.g., through information indicating that the customer logged onto requestor user device and using the verification information and verification token as described herein).

In some implementations, the interaction may be between requestor user device 210 and provider user device 220. According to some implementations, the interaction may include provider user device 220 capturing an image of a display (e.g., scan a display) of requestor user device 210 (e.g., which may be displaying a transaction token (e.g., a quick response (QR) code or bar code generated based on the transaction request, a transaction identifier, transaction request time/location, etc.) and/or vice versa, a near field communication (NFC) session being established between requestor user device 210 and provider user device 220, requestor user device 210 identifying a signal from provider user device 220 and/or vice versa, a user input being received via requestor user device 210 and/or provider user device 220 (e.g., indicating that the customer and service agent have met and/or are in each other's presence), and/or the like.

In some implementations, service provider system 230 may receive a notification of the interaction associated with provider user device 220 and/or requestor user device 210. Additionally, or alternatively, service provider system 230 may determine that provider user device 220 and requestor user device 210 are within a threshold distance of a location associated with the request based on receiving the notification of the interaction associated with provider user device 220 and/or requestor user device 210. Accordingly, service provider system 230 may determine that the customer and the service agent have met or are in each other's presence based on being within a threshold distance of the location.

In this way, service provider system 230 may obtain verification information from requestor user device 210 to permit service provider system 230 to verify an identity of a customer, associated requestor user device 210, that requested the service.

As further shown in FIG. 4, process 400 may include generating a verification token based on the one or more characteristics of the requestor user device (block 440). For example, service provider system 230 may generate the verification token for the request for the service. In some implementations, service provider system 230 may generate the verification token based on obtaining the verification information from requestor user device 210.

In some implementations, the verification token may be a quick response (QR) code, a bar code, an encrypted string of characters, and/or any other type of code that can be encrypted/decrypted. Accordingly, the verification token may include a token that can be encrypted or decrypted using a key and/or one or more inputs. Accordingly, if the verification token is encrypted with the key and the one or more inputs, the verification token can be decrypted with the key such that the one or more inputs may be identified from the verification token. As such, service provider system 230 may encrypt the verification token using an encryption key and the one or more characteristics of requestor user device 210. In such a case, the encryption key may be one or more real-time characteristics (e.g., time and/or location) associated with requestor user device 210, provider user device 220, and/or an interaction between requestor user device 210 and provider user device 220. The example encryption key may be used to decrypt the verification token to identify the one or more characteristics (e.g., identification information, account information, and/or the like) of requestor user device 210 and/or a user associated with requestor user device 210. Accordingly, as further described herein, if the one or more characteristics decrypted from the verification token match (e.g., within a threshold) the one or more characteristics in the verification information (which may be provided to provider user device 220), then provider user device 220 may verify requestor user device 210.

According to some implementations, service provider system 230 may generate the verification token by encrypting the verification token using one or more characteristics (which may be included in the verification information or based on receipt of the verification information) of requestor user device 210 as encryption information (i.e., as an input to encrypt the verification token) and/or a transaction identifier for the request as encryption information. As such, provider user device 220 (and/or service provider system 230) may decrypt the verification token (e.g., using real-time characteristics associated with requestor user device 210, provider user device 220, and/or an interaction between requestor user device 210 and provider user device 220) to identify the one or more characteristics and/or the transaction identifier for the request.

In some implementations, to generate the verification token, service provider system 230 may identify or extract the one or more characteristics of requestor user device 210 in the verification information and encrypt the verification token using the one or more characteristics of requestor user device 210 as encryption information to encrypt the verification token.

In some implementations, service provider system 230 may regenerate a verification token for a request from requestor user device 210. For example, requestor user device 210 may trigger a regeneration process (e.g., by resending verification information) after a period of time passes and/or user device 210 moves outside of a threshold distance of an original location provided in the verification information (e.g., the original location of an interaction with provider user device 220). Accordingly, the verification information may be updated to accurately indicate the real-time characteristics of requestor user device 210 (and/or a time at which service is to be provided via provider user device 220), thus frequently updating an encryption key to encrypt and/or decrypt identification information in the verification information. In some implementations, service provider system 230 may utilize thresholds to allow cases where real-time characteristics of requestor user device 210 do not exactly match real-time characteristics received from provider user device 220. For example, if provider user device 220 decrypts the verification token within a threshold number of seconds, minutes, and/or the like and/or within a threshold distance indicated by the real-time characteristics of requestor user device 210, then the identification may be verified as described below. On the other hand, if the time and/or location are outside of a particular threshold amount of time or threshold distance, then the identification verification may fail.

In some implementations, if a customer identity cannot be identified based on a first verification token provided to requestor user device 210 (e.g., because a period of time to verify the customer identification expired), then service provider system 230 may generate a second verification token using updated characteristics of requestor user device 210 (e.g., a new time or location of an the interaction or a subsequent interaction associated with requestor user device 210 and/or provider user device 220). In such cases, service provider system 230 may receive a notification that requestor user device 210 cannot be verified. Further, service provider system 230 may receive additional verification information after requestor user device 210 could not be verified based on the verification information and the verification token. The additional verification information may include one or more characteristics associated with requestor user device 210 after the requestor user device 210 could not be verified. Accordingly, the one or more characteristics of the initially received verification information may be different from the one or more characteristics of the additional verification information. Service provider system 230 may generate another verification token based on the additional verification information and provide the other verification token to requestor user device 210. Additionally, or alternatively, service provider system 230 may provide the additional verification information to provider user device 220 to permit provider user device 220 to verify requestor user device 210, in connection with the performance of the service and after requestor user device 210 could not be verified based on the verification information and the verification token, based on receiving the additional verification information and obtaining the other verification token from the requestor user device.

In this way, service provider system 230 may generate a verification token to permit service provider system 230 to verify an identity of a customer associated with requestor user device 210.

As further shown in FIG. 4, process 400 may include providing the verification token to the requestor user device (block 450). For example, service provider system 230 may provide the verification token to requestor user device 210. In some implementations, service provider system 230 may provide the verification token based on generating the verification token.

According to some implementations, the verification token may be provided to requestor user device 210 to permit provider user device 220 to obtain the verification token from requestor user device 210. As such, provider user device 220 (and/or service provider system 230) may be able to verify an identity of the customer of requestor user device 210 by comparing the verification token to verification information received from service provider system 230.

In this way, service provider system 230 may provide the verification token to requestor user device 210 to permit service provider system 230 to verify an identity of a customer of requestor user device 210.

As further shown in FIG. 4, process 400 may include providing the verification information to the provider user device to permit the provider user device to verify the requestor user device, in connection with performance of the service, based on receiving the verification information and obtaining the verification token from the requestor user device (block 460). For example, service provider system 230 may provide the verification information to provider user device 220. In some implementations, service provider system 230 may provide the verification information to provider user device 220 based on receiving the verification information from requestor user device 210, based on generating the verification token, and/or based on providing the verification token to requestor user device 210.

In some implementations, the verification information permits provider user device 220 to verify requestor user device 210 (and, thus, an identity of a customer of requestor user device 210) in connection with performance of the service by enabling provider user device 220 to compare verification information received from service provider system 230 and information decrypted from the verification token obtained from requestor user device 210. Accordingly, if provider user device 220 determines that one or more characteristics of requestor user device 210 decrypted (e.g., using real-time characteristics of provider user device 220) from the verification token match (e.g., within a threshold) one or more characteristics of requestor user device 210 in the verification information (which may be provided to provider user device 220), then provider user device 220 may verify requestor user device 210 in connection with performance of the service. For example, provider user device 220 (and/or service provider system 230) may determine that both request user device 210 and provider user device 220 have matching real-time characteristics for a transaction based on provider user device 220 decrypting verification token using real-time characteristics of provider user device 220. As such, if the decrypted verification token, using real-time characteristics of provider user device 220, indicates identification information from the verification information for the request for service, then provider user device 220 (and/or service provider system 230) may determine a match (e.g., within a threshold time and/or location) to verify requestor user device 210. Additionally, or alternatively, provider user device 220 may verify a match between a transaction identifier included in the verification information and a transaction identifier decrypted from the verification token.

According to some implementations, when requestor user device 210 presents a verification token to provider user device 220 at a different time associated with encrypting the verification token and/or at a different location associated with encrypting the verification token, the real-time characteristics of the provider user device 220 are not going to match the real-time characteristics of user device 210 used to encrypt the verification token. As such the identification verification process fails because the provider user device 220 (and/or service provider system 230) may not accurately decrypt the verification token to identify the identification information of the verification information. Furthermore, although the time and/or location may match for encryption and/or decryption of the verification token, if the decrypted identification information does not match the verification information for the service, then the identification verification fails due to the false identification information.

In some implementations, when provider user device 220 verifies requestor user device 210, provider user device 220 may send a verification confirmation to service provider system 230. The verification confirmation may indicate that the verification token was received or obtained by provider user device 220 from requestor user device 210 (e.g., via capturing an image of the verification token, via a communication (e.g., NFC), and/or the like).

Accordingly, service provider system 230 may receive the verification confirmation from provider user device 220. As such, the verification confirmation from provider user device 220 may indicate to service provider system 230 that provider user device 220 has verified requestor user device 210 (e.g., by verifying that requestor user device 210 requested the service) based on determining the one or more characteristics indicated by the verification token match (e.g., within a threshold) the one or more characteristics included in the verification information. For example, provider user device 220 might determine a substantial match if provider user device 220 receives the verification information within a threshold period of time as indicated by the decrypted one or more characteristics, is located within a threshold distance of a location indicated by the decrypted one or more characteristics, identification information of the verification information (and/or a specified application) substantially matches the decrypted one or more characteristics, and/or a transaction identifier of the verification information substantially matches the decrypted one or more characteristics.

Additionally, or alternatively, in some implementations, service provider system 230 may process a transaction associated with the service based on the verification confirmation. For example, service provider system 230 may implement a service charge for performance of the service (e.g., by charging an account of the customer), cause an exchange of funds between accounts of the customer of requestor user device 210, service provider system 230, and/or the service agent of provider user device 220. Accordingly, processing the transaction may involve debiting an account of a user (i.e., the customer) associated with requestor user device 210, crediting an account of a user (i.e., the service agent) associated with provider user device 220, and/or the like.

In some implementations, requestor user device 210 and/or provider user interface 220 may facilitate the customer and/or service agent, respectively, rating the service and/or transaction. Additionally, or alternatively, requestor user device 210 may be used to adjust a rating associated with the service agent (or provider user device 220). In some implementations, a reward may be provided (e.g., a coupon, discount on future use, client loyalty rewards, and/or the like) may be provided to the customer and/or service agent. Additionally, or alternatively, service provider system 230 may provide, via requestor user device 210 and/or provider user device 220, a survey for user by service provider system 230 to improve the operation of service provider system 230.

In this way, service provider system 230 may verify a customer identification in connection with a performance for a location-based transaction.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
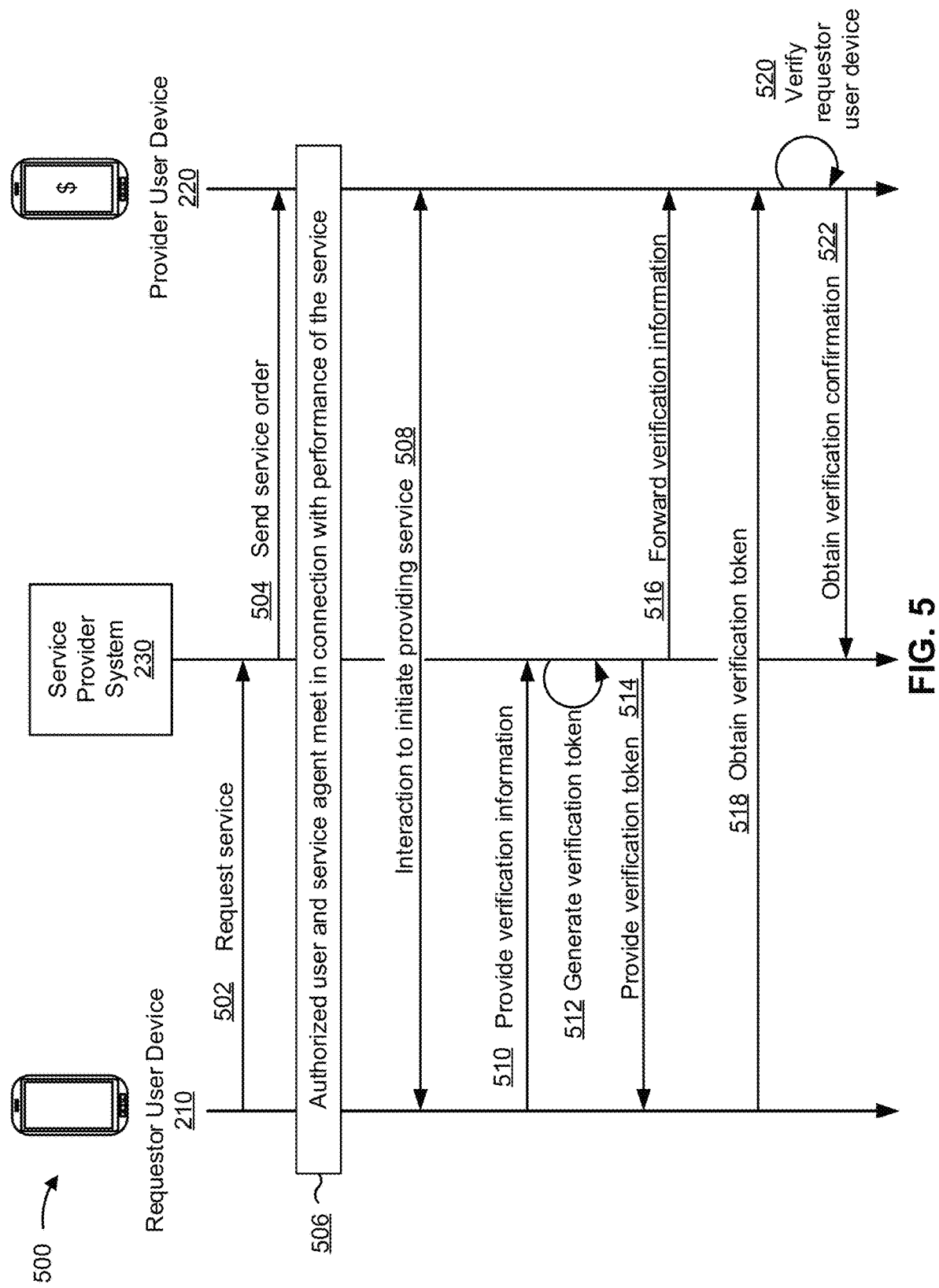
FIG. 5 is a call flow diagram of an example call flow for verifying customer identification for location-based transactions according to the example process shown in FIG. 4.

FIG. 5 is a call flow diagram of an example call flow 500 for verifying customer identification for location-based transactions according to the example process shown in FIG. 4. FIG. 5 shows an example of verifying customer identification for a location-based transaction. As shown in FIG. 5, a series of messages and/or events involving requestor user device 210, provider user device 220, and/or service provider system 230 may enable verification of customer identification for the location-based transaction.

As shown in FIG. 5, and by reference number 502, requestor user device 210 sends a request for service to service provider system 230. As shown by reference number 504, service provider system 230 sends a service order to provider user device 220 (e.g., to indicate that a service agent is requested to perform/provide the service). As shown by reference number 506, an authorized user (e.g., a customer) and a service agent meet in connection with performance of the service.

As further shown in FIG. 5, and by reference number 508, an interaction occurs between requestor user device 210 and provider user device 220. In some implementations, the interaction may occur between requestor user device 210 and service provider system 230 (e.g., a request for a verification token) and/or provider user device 220 and service provider system 230 (e.g., instructions to send a verification token to requestor user device 210). As shown by reference number 510, requestor user device 210 provides verification information (e.g., including one or more characteristics of requestor user device 210, a transaction identifier, and/or the like). As shown by reference number 512, service provider system 230 generates the verification token. As shown by reference number 514, service provider system 230 provides the verification token to requestor user device 210.

Furthermore, as shown in FIG. 5, and by reference number 516, service provider system 230 forwards the verification information to provider user device 220. As shown by reference number 518, provider user device 220 obtains the verification token from requestor user device 210. As shown by reference number 520, provider user device 220 verifies the requestor user device 210 (e.g., based on decrypting the verification token and comparing the decrypted verification information with the verification information received from service provider system 230). As shown by reference number 522, service provider system 230 obtains a verification confirmation from provider user device 220.

As indicated above, FIG. 5 is provided merely as an example. Other examples are possible and may differ from what was described with regard to FIG. 5.

Figure 6A:
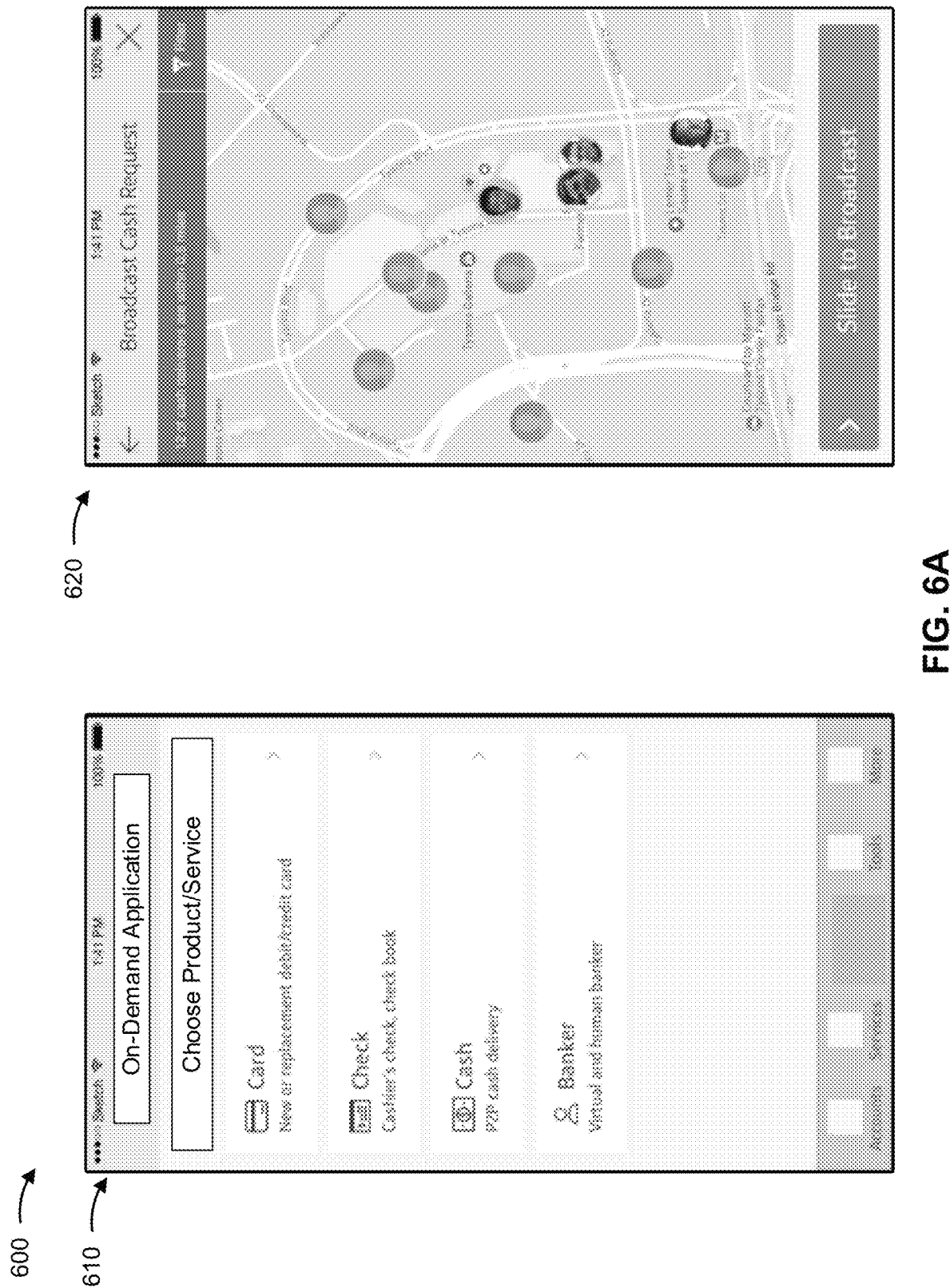
FIGS. 6A-6C are diagrams of an example implementation relating to the example process shown in FIG. 4.
Figure 6B:
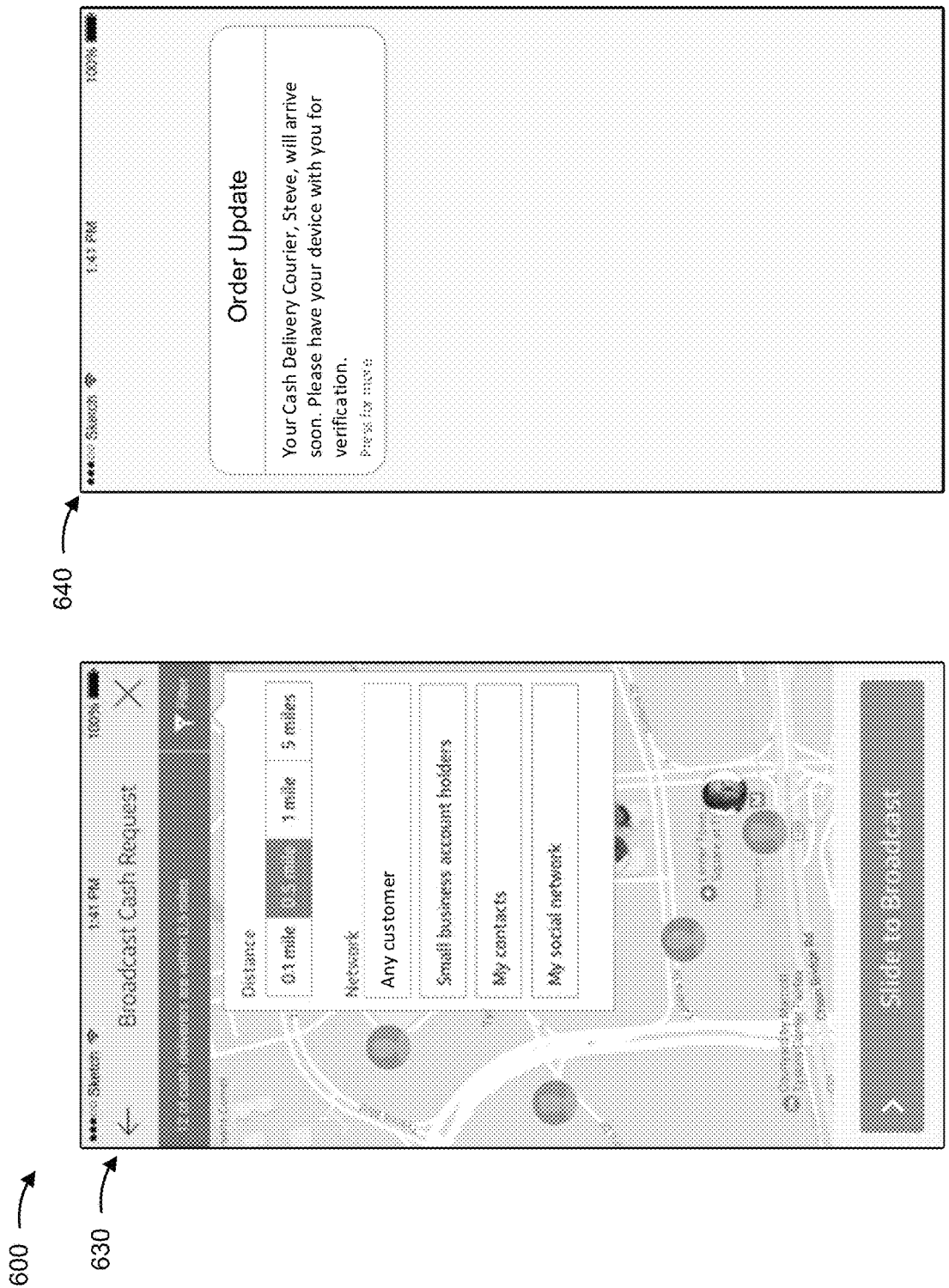
Figure 6C:
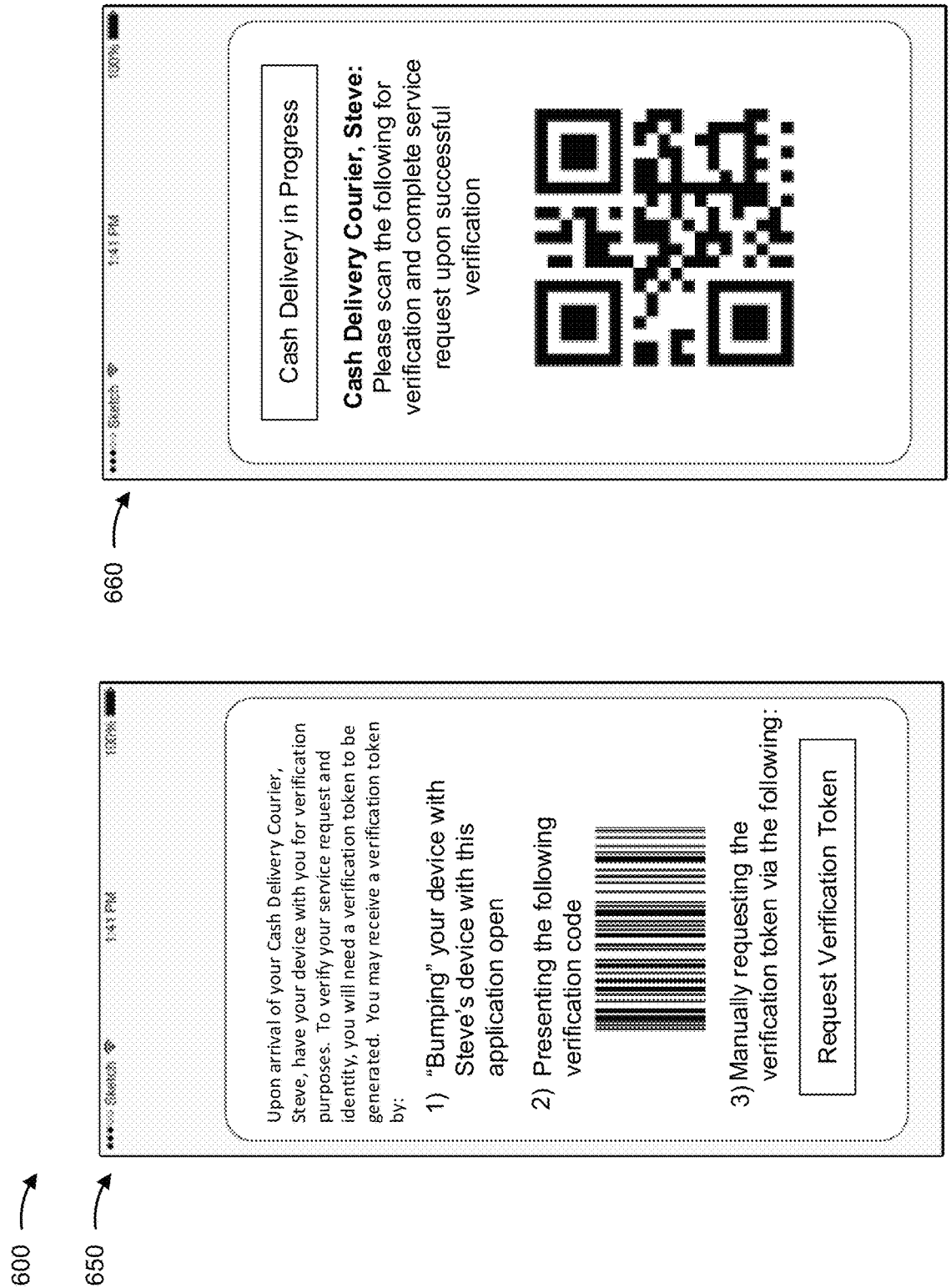

FIGS. 6A-6C are diagrams of an example implementation 600 relating to example process 400 shown in FIG. 4. FIGS. 6A-6C show an example of verifying customer identification for a location-based transaction. FIGS. 6A-6C show example user interfaces of a peer-to-peer transaction application that may operate on requestor user device 210, which may be used to communicate with service provider system 230 to have services and/or products delivered to a customer of requestor user device 210.

As shown in FIG. 6A, an example user interface 610 depicts a display of requestor user device 210 that enables a customer of requestor user device 210 to select a product or service to be requested from a provider user device 220 via service provider system 230. In the example user interface 610, a customer may select from options related to requesting a card, a check, cash products, or banker services. Assume that the customer of requestor user device 210 selects the cash products option.

As further shown in FIG. 6A, an example user interface 620 depicts a display of requestor user device 210 that enables the customer of requestor user device 210 to see locations, on a map, of potential provider user devices 220 of service agents that can deliver cash. The locations may have been provided, for example, by service provider system 230 in response to the customer's selection of a request for cash delivery. In some implementations, service provider system 230 may obscure, or otherwise hide, an identity of one or more service agents.

As shown in FIG. 6B, an example user interface 630 depicts a display of requestor user device 210 that enables the customer of requestor user device 210 to select a particular provider user device 220 (e.g., a service agent) to provide the requested product (e.g., cash) to the customer of requestor user device 210. The example user interface 630 depicts some filters that may be applied by the customer of requestor user device 210, such as distance and social network filters.

As further shown in FIG. 6B, an example user interface 640 depicts a display of requestor user device 210 that enables the user of requestor user device 210 to view instructions associated with verifying the customer's identity. For example, the instructions may indicate an identity of the service agent (shown as "Cash Delivery Courier, Steve") and notify that the customer is to be prepared to have requestor user device 210 ready for verification. In some implementations, the example user interface 640 may display an estimated time of arrival (ETA) for the service agent of the selected provider user device 220 (e.g., the cash deliverer) arriving at the location provided by the customer of requestor user device 210.

As shown in FIG. 6C, an example user interface 650 depicts a display of further instructions for the customer to verify the customer's identity and/or service request. For example, the instructions of user interface 650 may show instructions involving an interaction with service provider system 230 and/or provider user device 220. As shown, the customer may verify the customer's identity by "bumping" requestor user device 210 with provider user device 220 (e.g., for an NFC session), by presenting a bar code to be scanned by provider user device 220, and/or manually requesting a verification token by clicking a button.

As further shown in FIG. 6C, an example user interface 660 depicts a display of a QR code as a verification token that can be used to verify the customer's identity and requestor user device 210. According to some implementations described herein, the QR code may be generated by service provider system 230 and provided to requestor user device 210. Provider user device 220 may verify the customer's identity and/or requestor user device 210 by scanning the QR code, as described herein.

Accordingly, the example user interfaces of example implementation 600, which may be implemented by requestor user device 210, may be used to verify a customer identity for a location-based transaction, as described herein.

As indicated above, FIGS. 6A-6C are provided merely as examples. Other examples are possible and may differ from what was described with regard to FIGS. 6A-6C.

Accordingly, some implementations herein provide a dynamic customer identification process for location-based transactions. Because a verification token may be dynamically created based on characteristics of a requestor user device used in a location-based transaction, fraudulent activity (e.g., hacking, identity theft, and/or the like) can be avoided. Accordingly, a service agent may remotely verify a customer's identity and/or a user device in connection with performance of a service. As such, using some implementations herein, fraudulent activity, resulting in lost funds, unnecessary use of computing resources, and/or the like may be avoided in location-based transactions.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
   obtaining, by a server device, a request for a service from a requestor user device;
   obtaining, by the server device and from the requestor user device, a real-time characteristic of the requestor user device based on an interaction between the requestor user device and a provider user device,
      wherein the real-time characteristic of the requestor user device is associated with at least a first time associated with the interaction;
   providing, by the server device, verification information to the provider user device to facilitate providing the service;
   dynamically generating, by the server device, a verification token by encrypting the verification information associated with the requestor user device using the real-time characteristic of the requestor user device as encryption information,
      wherein the verification information is encrypted using the first time to generate the verification token, and
      wherein the verification token is configured to be decryptable using a different time than the first time, which is within a threshold amount of time from the first time, to determine the verification information;
   providing, by the server device, the verification token to the requestor user device to be sent to the provider user device for decryption using a real-time characteristic of the provider user device,
      wherein the real-time characteristic of the provider user device is associated with at least a second time associated with decryption of the verification token, and
      wherein the first time is different than the second time;
   obtaining, by the server device, a verification confirmation from the provider user device indicating that the provider user device verified the requestor user device based on whether a decrypted version of the verification token, decrypted using the real-time characteristic of the provider user device, matches the verification information,
      wherein the decrypted version of the verification token matches the verification information if the second time, associated with decryption of the verification token, is within the threshold amount of time of the first time; and processing, by the server device, a transaction associated with the service based on the verification confirmation.

2. The method of claim 1, wherein the verification token is a quick response (QR) code or a bar code.

3. The method of claim 1, wherein the real-time characteristic of the requestor user device is further associated with a first location of the requestor user device associated with the interaction, and wherein the real-time characteristic of the provider user device is further associated with a second location of the provider user device associated with the interaction.

4. The method of claim 1, further comprising:

regenerating the verification token based on a threshold period of time passing or the requestor user device moving outside a location associated with the interaction.

5. The method of claim 1, wherein processing the transaction comprises at least one of:

debiting an account of a user associated with the requestor user device; or crediting an account of a user associated with the provider user device.

6. The method of claim 1, wherein the service involves at least one of:

delivering currency, delivering a cashier's check, delivering a transaction card, or providing a banking service.

7. A server device, comprising:

one or more memories; and one or more processors communicatively coupled to the one or more memories, configured to:

obtain a request for a service from a requestor user device;

obtain, from the requestor user device, a real-time characteristic of the requestor user device based on an interaction between the requestor user device and a provider user device, wherein the real-time characteristic of the requestor user device is at least associated with a first time associated with the interaction;

provide verification information to the provider user device to facilitate providing the service;

dynamically generate a verification token by encrypting the verification information associated with the requestor user device using the real-time characteristic of the requestor user device as encryption information, wherein the verification information is encrypted using the first time to generate the verification token, and wherein the verification token is configured to be decryptable using a different time than the first time, which is within a threshold amount of time from the first time, to determine the verification information;

provide the verification token to the requestor user device to be sent to the provider user device for decryption using a real-time characteristic of the provider user device, wherein the real-time characteristic of the provider user device is associated with at least a second time associated with decryption of the verification token, and wherein the first time is different than the second time;

obtain a verification confirmation from the provider user device indicating that the provider user device verified the requestor user device based on whether a decrypted version of the verification token, decrypted using the real-time characteristic of the provider user device, matches the verification information, wherein the decrypted version of the verification token matches the verification information if the second time, associated with decryption of the verification token, is within the threshold amount of time of the first time; and process a transaction associated with the service based on the verification confirmation.

8. The server device of claim 7, wherein the verification token is a quick response (QR) code or a bar code.

9. The server device of claim 7, wherein the real-time characteristic of the requestor user device is further associated with a first location of the requestor user device associated with the interaction, and wherein the real-time characteristic of the provider user device is further associated with a second location of the provider user device associated with the interaction.

10. The server device of claim 7, wherein the one or more processors are further configured to:

regenerate the verification token based on a threshold period of time passing or the requestor user device moving outside a location associated with the interaction.

11. The server device of claim 7, wherein processing the transaction comprises at least one of:

debit an account of a user associated with the requestor user device; or credit an account of a user associated with the provider user device.

12. The server device of claim 7, wherein the service involves at least one of:

deliver currency, deliver a cashier's check, deliver a transaction card, or provide a banking service.

13. A non-transitory computer-readable medium storing instructions, the instructions comprising:

one or more instructions that, when executed by one or more processors, cause the one or more processors to:

obtain a request for a service from a requestor user device;

obtain, from the requestor user device, a real-time characteristic of the requestor user device based on an interaction between the requestor user device and a provider user device, wherein the real-time characteristic of the requestor user device is associated with at least a first time associated with the interaction;

provide verification information to the provider user device to facilitate providing the service;

dynamically generate a verification token by encrypting the verification information associated with the requestor user device using the real-time characteristic of the requestor user device as encryption information, wherein the verification information is encrypted using the first time to generate the verification token, and wherein the verification token is configured to be decryptable using a different time than the first time, which is within a threshold amount of time from the first time, to determine the verification information;

provide the verification token to the requestor user device to be sent to the provider user device for decryption using a real-time characteristic of the provider user device,
- wherein the real-time characteristic of the provider user device is associated with at least a second time associated with decryption of the verification token, and
- wherein the first time is different than the second time;

obtain a verification confirmation from the provider user device indicating that the provider user device verified the requestor user device based on whether a decrypted version of the verification token, decrypted using the real-time characteristic of the provider user device, matches the verification information,
- wherein the decrypted version of the verification token matches the verification information if the second time, associated with decryption of the verification token, is within the threshold amount of time of the first time; and process a transaction associated with the service based on the verification confirmation.

14. The non-transitory computer-readable medium of claim 13, wherein the verification token is a quick response (QR) code or a bar code.

15. The non-transitory computer-readable medium of claim 13, wherein the real-time characteristic of the requestor user device is based on a first location of the requestor user device associated with the interaction, and
- wherein the real-time characteristic of the provider user device is based on a second location of the provider user device associated with the interaction.

16. The non-transitory computer-readable medium of claim 13, wherein the one or more instructions, when executed by the one or more processors, further cause the one or more processors to:
regenerate the verification token based on a threshold period of time passing or the requestor user device moving outside a location associated with the interaction.

17. The non-transitory computer-readable medium of claim 13, wherein processing the transaction comprises at least one of:
debit an account of a user associated with the requestor user device; or
credit an account of a user associated with the provider user device.

18. The method of claim 1, wherein the threshold amount of time from the first time is a threshold quantity of seconds and less than a minute.

19. The server device of claim 7, wherein the threshold amount of time from the first time is a threshold quantity of seconds and less than a minute.

20. The non-transitory computer-readable medium of claim 13, wherein the threshold amount of time from the first time is a threshold quantity of seconds and less than a minute.

* * * * *